US006902002B1

(12) United States Patent
Chatterji et al.

(10) Patent No.: US 6,902,002 B1
(45) Date of Patent: Jun. 7, 2005

(54) CEMENT COMPOSITIONS COMPRISING IMPROVED LOST CIRCULATION MATERIALS AND METHODS OF USE IN SUBTERRANEAN FORMATIONS

(75) Inventors: Jiten Chatterji, Duncan, OK (US); Bobby J. King, Duncan, OK (US); Roger S. Cromwell, Walters, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/802,903

(22) Filed: Mar. 17, 2004

(51) Int. Cl.⁷ .................... E21B 33/13; E21B 33/138; C04B 16/04
(52) U.S. Cl. ................ 166/293; 106/696; 106/724; 106/802; 106/823; 166/292; 166/295; 405/129.35; 588/252; 588/255
(58) Field of Search ................. 166/283, 292, 166/293, 294, 295; 175/72; 106/600, 696, 724, 802, 823; 405/129.35, 129.4; 588/252, 255

(56) References Cited

U.S. PATENT DOCUMENTS

| | | |
|---|---|---|
| 2,353,372 A | 7/1944 | Stone |
| 2,912,380 A | 11/1959 | Groves |
| 2,990,016 A | 6/1961 | Goins, Jr. et al. ............. 166/29 |
| 3,042,608 A | 7/1962 | Morris ........................ 507/112 |
| 3,220,863 A | 11/1965 | Mayhew |
| 3,302,719 A | 2/1967 | Fischer |
| 3,316,965 A | 5/1967 | Watanabe |
| 3,363,689 A | 1/1968 | Smith et al. |
| 3,375,888 A | 4/1968 | Lummus et al. .............. 175/72 |
| 3,433,740 A | 3/1969 | Armentrout |
| 3,774,683 A | 11/1973 | Smith et al. ................. 166/285 |
| 4,031,184 A * | 6/1977 | Mizumoto et al. ......... 521/46.5 |
| 4,391,643 A | 7/1983 | Murphey |
| 4,436,850 A * | 3/1984 | Burdick et al. ................. 524/8 |
| 4,460,052 A | 7/1984 | Gockel ........................ 175/72 |
| 4,498,995 A | 2/1985 | Gockel |
| 4,552,486 A * | 11/1985 | Knox et al. .................. 405/227 |
| 4,579,668 A | 4/1986 | Messenger |
| 4,772,430 A * | 9/1988 | Sauda et al. .................... 588/8 |
| 4,871,395 A * | 10/1989 | Sugama ...................... 108/678 |
| 5,314,265 A | 5/1994 | Perkins et al. |
| 5,501,277 A | 3/1996 | Onan et al. .................. 166/293 |
| 5,736,594 A * | 4/1998 | Boles et al. .................... 524/2 |
| 5,779,787 A | 7/1998 | Brothers et al. ............ 106/802 |
| 5,820,670 A | 10/1998 | Chatterji et al. ............ 106/727 |
| 5,913,364 A | 6/1999 | Sweatman .................. 166/281 |
| 6,059,035 A | 5/2000 | Chatterji et al. ............ 166/293 |
| 6,059,036 A | 5/2000 | Chatterji et al. ............ 166/294 |
| 6,060,434 A | 5/2000 | Sweatman et al. .......... 507/216 |
| 6,152,227 A | 11/2000 | Lawson et al. ............. 166/293 |
| 6,167,967 B1 | 1/2001 | Sweatman .................. 166/281 |
| 6,220,354 B1 | 4/2001 | Chatterji et al. ............ 166/293 |
| 6,258,757 B1 | 7/2001 | Sweatman et al. .......... 507/219 |
| 6,308,777 B2 | 10/2001 | Chatterji et al. ............ 166/293 |
| 6,500,252 B1 | 12/2002 | Chatterji et al. ............ 106/644 |
| 6,508,305 B1 | 1/2003 | Brannon et al. ............ 166/293 |
| 6,508,306 B1 | 1/2003 | Reddy et al. ............... 166/295 |
| 6,645,288 B1 | 11/2003 | Dargaud et al. ............ 106/696 |
| 6,702,044 B2 | 3/2004 | Reddy et al. ................. 175/64 |
| 2002/0040812 A1 | 4/2002 | Heying ........................ 175/72 |
| 2003/0092582 A1 | 5/2003 | Reddy et al. ............... 507/100 |
| 2003/0132000 A1 | 7/2003 | Shaarpour .................. 166/264 |
| 2003/0186819 A1 | 10/2003 | Shaarpour .................. 507/200 |
| 2003/0195120 A1 | 10/2003 | Halliday et al. ............ 507/140 |
| 2004/0007360 A1 | 1/2004 | Leroy-Delage et al. ..... 166/293 |
| 2004/0023815 A1 | 2/2004 | Burts, III .................... 507/200 |
| 2004/0040712 A1 | 3/2004 | Ravi et al. .................. 166/293 |
| 2004/0244978 A1 * | 12/2004 | Shaarpour .................. 507/200 |

OTHER PUBLICATIONS

B. Chen & J. Liu, "Properties of Lightweight Expanded Polystyrene Concrete Reinforced with Steel Fiber," *Cem. Concr. Res.* 34:1259–63 (2004).

ABSTRACT of Z. Owsiak, "Alkali–Aggregate Reaction in Concrete Containing High–Alkali Cement and Granite Aggregate," *Cem. Concr. Res.*, 34(1):7–11 (2004).

ABSTRACT of Lorenzo, P.; Goni, S.; Hernandez, S.; Guerrero, A. "Effect of Fly Ashes with High Total Alkali Content on the Alkalinity of the Pore Solution of Hydrated Portland Cement Paste," *Journal of the American Ceramic Society* (1996), 79(2), 470–4.

ABSTRACT of Linklater, C.M.; Albinsson, Y.; Alexander, W.R.; Casas, I.; McKinley, I.G.; Sellin, P. "A Natural Analog of High–pH Cement Pore Waters from the Maqarin Area of Northern Jordan: Comparison of Predicted and Observed Trace–Element Chemistry of Uranium and Selenium," *Journal of Contaminant Hydrology* (1996), 21(1–4), 59–69.

ABSTRACT of Krivenko, P.V. "Alkaline Cements," *Int. Congr. Chem. Cem.*, 9th (1992) 4 482–8.

ABSTRACT of Lu, Chunxuan; Wang, Jiezeng; Chen, Xufeng; Shi, Huisheng; Chen, Wei; Zhang, Jingyu "How to Make Better Use of Cement Raw Materials with Higher Alkali Content," *Guisuanyan Xuebao* (1993) ,21(6) 554–63.

(Continued)

*Primary Examiner*—George Suchfield
(74) *Attorney, Agent, or Firm*—Craig W. Roddy; Baker Botts L.L.P.

(57) ABSTRACT

The present invention relates to subterranean cementing operations and, more particularly, to cement composition that include improved lost circulation materials, and methods of using such cement compositions in subterranean formations. In certain exemplary embodiments, the improved lost circulation materials include inelastic particles of polyethylene, polystyrene and/or polypropylene. Optionally, the cement compositions also may include additives such as fly ash, a surfactant, a dispersant, a fluid loss control additive, a conventional lost circulation material, an generator, a retarder, a salt, a mica, fiber, a formation-conditioning agent, fumed silica, bentonite, expanding additives, microspheres, weighting materials, or a defoamer.

40 Claims, No Drawings

OTHER PUBLICATIONS

ABSTRACT of J. Davidovits, "High–Alkali Cements for 21st Century Concretes," *Fr. Am. Concr. Inst., SP–144(Concrete Technology)*, 383–97 (1994).

ABSTRACT of Chen, Xufeng; Lu, Chunxuan. "Effect of Alkali on Hydration Process and Properties of Cement," *Guisuanyan Xuebao* (1993), 21(4), 301–8.

ABSTRACT of Pugachev, G.A.;Volkov, S.V.; Avtonomov, I.V.; Ovcharenko, G.I. "Comparative Studies of the Strength of Highly Active Alkaline Cements of Various Compositions," *Izvestiya Vysshikh Uchebnykh Zavedenii Stroitel'stvo* (1992), (9–10), 45–8.

ABSTRACT of Haruna, Junsuke. "High–Strength and Low– Drying Shrinkage Slag Alkali Cement," *Kokai Tokkyo Koho* (1992).

ABSTRACT of Benshtein, Yu, I.; Panina, N.S.; Ershova, L.A. "Evaluation of the Effectiveness of Silica Additives Added to High–Alkaline Cement for Preventing Internal Corrosion of Concrete," *Zhurnal Prikladnoi Khimii*, 60(2):349–55 (1987).

ABSTRACT of Spellman, Louis U. "Some Opportunities to Offset Poor Quality Characteristics of High–Alkali Cement," *Cement, Concrete, and Aggregates* (1983), 5(1), 73–6.

ABSTRACT of Timashev, V.V.; Bykova, S.N.; Sevost'yanova, L.I. "Characteristics of High–Alkali Portland Cement Hydration in the Presence of Phosphorus–Containing Additives," *Tr. VNII Tsement. Prom–sti* (1982), (65), 61–8.

ABSTRACT of Kryzhanovskaya, I.A.; Mirak'yan, V.M.; Shokotova, B.G. "Alkali Compounds in Clinker and Setting of Highly Alkaline Portland Cements," *Yuzhgiprotsement* (1971), 12 65–79.

ABSTRACT of Luginina, I.G.; Luginin, A.N.; Polyakov, G.P. "Cause of the Rapid Hardening of High–Alkali Cements," *Tsement* (1971), (10), 17–18.

Halliburton brochure entitled "Flocele Lost–Circulation Additive" dated 1999.

Halliburton brochure entitled "Flo–Chek® A Additive" dated 1999.

Halliburton brochure entitled "Flo–Chek® Service Lost–Circulation Service" dated 2000.

Halliburton brochure entitled "Gilsonite Lost–Circulation Additive" dated 1999.

Halliburton brochure entitled "Granulite TR ¼ Lost–Circulation Additive" dated 1999.

Halliburton brochure entitled "Kwik–Seal® Lost–Circulation Additive" dated 2002.

Halliburton brochure entitled "Tuf Additive No. 2 Lost–Circulation Additive" dated 1999.

Baroid brochure entitled "BARO–SEAL™ Lost Circulation Material" dated 2000.

Baroid brochure entitled "HYDRO–PLUG™ Seal While You Drill™ Technology" Dated 2002.

Baroid brochure entitled "JELFLAKE® Lost Circulation Material" dated 2002.

Baroid brochure entitled "HY–SEAL® Lost Circulation Material" dated 2002.

Baroid brochure entitled "N–PLEX™ Lost Circulation Material" dated 2002.

Baroid brochure entitled "N–SEAL™ Lost–Circulation Material" dated 2002.

Baroid brochure entitled "N–SQUEEZE™ Lost Circulation Material" dated 2002.

Baroid brochure entiteld "PLUG–GIT® Lost Circulation Material" dated 2002.

Baroid brochure entitled "SUPERSEAL™ Lost Circulation Material" dated 2002.

Baroid brochure entitled "STEELSEAL FINE™ Lost Circulation Material" Dated 2002.

Baroid brochure entitled "STOP–FRAC™ D Lost Circulation Material" dated 2002.

Baroid brochure entitled "STOP–FRAC™ S Lost Circulation Material" dated 2002.

Baroid brochure entitled "WALL–NUT™ Lost Circulation Additive" dated 2002.

* cited by examiner

CEMENT COMPOSITIONS COMPRISING IMPROVED LOST CIRCULATION MATERIALS AND METHODS OF USE IN SUBTERRANEAN FORMATIONS

BACKGROUND OF THE INVENTION

The present invention relates to subterranean cementing operations and, more particularly, to cement compositions comprising improved lost circulation materials, and methods of using such cement compositions in subterranean formations.

Hydraulic cement compositions commonly are utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

Subterranean formations traversed by well bores often may be weak, highly permeable, and extensively fractured. In some cases, such formations may be unable to withstand the hydrostatic pressure normally associated with fluids (e.g., cement compositions and the like) being injected into the formation. In such cases, the hydrostatic pressure may be sufficient to force such fluids into the natural or created fractures and/or permeable zones of the formation, which may result in a significant loss of fluid into the formation. This loss of fluid circulation may be problematic for a number of reasons. For example, where the loss of circulation occurs during a cementing operation, excessive fluid loss may cause a cement composition to dehydrate prematurely. Premature dehydration of the cement composition may excessively viscosify the cement composition, and potentially may cause an operator to terminate the cementing operation, wash out the cement composition from the well bore, and restart the cementing operation anew.

Previous attempts to minimize the loss of circulation into the subterranean formation have involved adding a variety of additives, including, but not limited to, asphaltenes, ground coal, cellulosic materials, plastic materials, walnut hulls, sized waste formica, and the like, to the cement composition. Such additives have been included, for example, to attempt to plug or bridge formation fractures and/or the permeable zones in the formation where the treatment fluids typically may be lost. However, conventional materials often are not rigid, and thus a greater concentration of these materials may be required to effectively prevent the loss of circulation during a cementing operation.

Polyethylene is used extensively in manufacturing, for instance, trash cans, buckets, baskets, and other materials of commerce. With time, the plasticizer that often is a component of a typical polyethylene product may begin to degrade, which may cause the polyethylene to become increasingly brittle, which may reduce its usable life. Consumers generally have no use for brittle polyethylene materials and often discard or otherwise dispose of them, commonly in a landfill, where the polyethylene may reside indefinitely, because it generally does not deteriorate until after a very long time.

SUMMARY OF THE INVENTION

The present invention relates to subterranean cementing operations and, more particularly, to cement compositions comprising improved lost circulation materials, and methods of using such cement compositions in subterranean formations.

An example of a method of the present invention comprises a method of cementing a zone in a subterranean formation comprising: providing a cement composition comprising cement, inelastic lost circulation material particles, and water; placing the cement composition in a zone in a subterranean formation; and permitting the cement composition to set therein.

Another example of a method of the present invention comprises a method of reducing the loss of circulation of a cement composition in a zone in a subterranean formation comprising the step of adding an inelastic lost circulation material to the cement composition.

An example of a composition of the present invention comprises a cement composition comprising a hydraulic cement, an inelastic lost circulation material, and water.

Another example of a composition of the present invention is a lost circulation material comprising inelastic polyethylene, polystyrene, and/or polypropylene particles.

The features and advantages of the present invention will be readily apparent to those skilled in the art upon a reading of the description of the preferred embodiments that follows.

DESCRIPTION OF PREFERRED EMBODIMENTS

The present invention relates to subterranean cementing operations and, more particularly, to cement compositions comprising improved lost circulation materials, and methods of using such cement compositions in subterranean formations.

The cement compositions of the present invention generally comprise water, a hydraulic cement, and an improved lost circulation material of the present invention. Optionally, other additives may be included, such as fly ash, silica, fluid loss control additives, surfactants, dispersants, accelerators, retarders, salts, and the like.

The water utilized in the cement compositions of the present invention can be fresh water, saltwater (e.g., water containing one or more salts dissolved therein), brine (e.g., saturated saltwater), or seawater. Generally, the water can be from any source provided that it does not contain an excess of compounds (e.g., dissolved organics, such as tannins) that may adversely affect other components in the cement composition. Further, the water may be present in an amount sufficient to form a pumpable slurry. In certain exemplary embodiments, the water is present in the cement compositions of the present invention in an amount in the range of from about 30% to about 180% by weight of the cement ("bwoc") therein. In certain exemplary embodiments, the water is present in the cement compositions of the present invention in an amount in the range of from about 40% to about 90% bwoc therein. In certain exemplary embodiments, the water is present in the cement compositions of the present invention in an amount in the range of from about 40% to about 60% bwoc therein. One of ordinary skill in the art, with the benefit of this disclosure, will recognize the appropriate amount of water for a chosen application.

Any cements suitable for use in subterranean applications are suitable for use in the present invention. In certain exemplary embodiments, the improved cement compositions of the present invention comprise a hydraulic cement. Suitable examples of hydraulic cements that may be used include, but are not limited to, those that comprise calcium, aluminum, silicon, oxygen, and/or sulfur, which set and harden by reaction with water. Examples include, but are not limited to, Portland cements, pozzolanic cements, gypsum cements, calcium phosphate cements, high alumina content cements, silica cements, high alkalinity cements, and mixtures thereof.

The cement compositions of the present invention further comprise an improved lost circulation material of the present invention. Generally, the improved lost circulation materials of the present invention comprise any inelastic material that provides a desired level of control of the loss of circulation from the cement composition into the formation, with minimal adverse impact to the properties of the set cement. Among other things, certain embodiments of the lost circulation materials of the present invention may bridge and/or plug fractures and permeable zones in the formation zone so as to minimize the loss of fluid circulation into the formation. In certain exemplary embodiments, the lost circulation materials of the present invention have a density such that they do not rise to the surface of the well bore if circulation of the cement composition should cease. Generally, the lost circulation materials of the present invention may have a particle size distribution that provides a desired level of lost circulation control. In certain exemplary embodiments, the lost circulation materials of the present invention may have a particle size distribution in the range of from about 100 microns to about 5,000 microns. In certain exemplary embodiments, the lost circulation materials of the present invention may have a particle size distribution in the range of from about 200 microns to about 2,500 microns.

In certain exemplary embodiments, the lost circulation materials may comprise inelastic polyethylene, polypropylene, and/or polystyrene particles. In certain exemplary embodiments wherein the lost circulation materials comprise inelastic polyethylene particles, a variety of types of inelastic polyethylene particles may be suitable for use in accordance with the teachings of the present invention, including, but not limited to, waste polyethylene (e.g., polyethylene materials that have been discarded, for example, for deposit in a landfill). Suitable inelastic polyethylene particles are commercially available from, inter alia, Forta Corporation in Grove City, Pa. Polyethylene particles may have a melting point of about 280° F. Accordingly, in certain exemplary embodiments wherein the lost circulation materials of the present invention comprise waste polyethylene particles, such embodiments may be particularly suitable for use in cementing operations wherein the bottom hole circulation temperature is below about 260° F.

In certain exemplary embodiments, the lost circulation materials of the present invention may comprise waste polyethylene particles that have been granulated and sized using any suitable means (e.g., a granulator, a rotary mill, and a vibrating shaker screen). In certain instances, an operator may elect to reduce the size of polyethylene materials to a desirable size by using, e.g., a rough mill or knife hog before feeding them into the granulator. Within the granulator, multiple knives may cut and grind the polyethylene into smaller pieces. Generally, the polyethylene may remain inside the granulator, while its size is continually reduced, until the granulated particles have been reduced in size so as to pass through an exit screen that limits the maximum output size of the granulator to a desired size. In certain exemplary embodiments, the polyethylene particles further may be sized and sorted using, e.g., vibrating shaker screens. Exemplary methods of granulation and sizing may be found in U.S. Pat. No. 3,042,608, the relevant disclosure of which is hereby incorporated by reference.

In certain exemplary embodiments, the lost circulation materials of the present invention may comprise fine, medium, or coarse particles, or a mixture thereof. As referred to herein, the term "fine-sized particles" will be understood to mean particles having an average size in the range of less than about 150 microns. As referred to herein, the term "medium-sized particles" will be understood to mean particles having an average size in the range from about 250 microns to about 850 microns. As referred to herein, the term "coarsesized particles" will be understood to mean particles having an average size in the range of greater than about 1,100 microns. In certain exemplary embodiments, the lost circulation materials of the present invention may comprise about 45% to about 55% medium-sized particles by weight of the lost circulation material and about 45% to about 55% fine-sized particles by weight of the lost circulation material. In certain exemplary embodiments, the lost circulation materials of the present invention may comprise about 45% to about 55% coarse-sized particles by weight of the lost circulation material and about 45% to about 55% fine-sized particles by weight of the lost circulation material. In certain exemplary embodiments, the lost circulation materials of the present invention may comprise about 45% to about 55% coarse-sized particles by weight of the lost circulation material and about 45% to about 55% medium-sized particles by weight of the lost circulation material. The choice of a particular mixture of particle sizes may depend on a variety of factors, including, inter alia, the cement composition and formation type. One of ordinary skill in the art, with the benefit of this disclosure, will be able to identify a suitable mixture of particles sizes for a particular application.

The lost circulation materials of the present invention may be added to the cement compositions of the present invention in a variety of ways. In certain exemplary embodiments, the lost circulation materials may be dry-blended with the cement composition prior to the addition of the water. Generally, the lost circulation materials of the present invention may be present in the cement compositions of the present invention in an amount sufficient to provide a desired level of lost circulation control. In certain exemplary embodiments, the lost circulation materials of the present invention may be present in the cement compositions of the present invention in an amount in the range of from about 1 pound to about 10 pounds per sack of cement. In certain exemplary embodiments, the lost circulation materials of the present invention may be present in the cement compositions of the present invention in an amount in the range of from about 4 pounds to about 6 pounds per sack of cement. One of ordinary skill in the art, with the benefit of this disclosure, will recognize the appropriate amount of the lost circulation materials of the present invention to use for a chosen application.

Optionally, the cement compositions of the present invention further may comprise a conventional lost circulation material. The conventional lost circulation material may be any material that may minimize the loss of fluid circulation into the fractures and/or permeable zones of the formation. Examples of suitable conventional lost circulation materials include, but are not limited to, asphaltenes, ground coal, cellulosic materials, plastic materials, and the like. In certain exemplary embodiments, the conventional lost circulation materials may be provided in particulate form. One of ordinary skill in the art with the benefit of this disclosure will recognize the appropriate amount of the conventional lost circulation material for a chosen application.

Optionally, additional additives may be added to the cement compositions of the present invention as deemed appropriate by one skilled in the art, with the benefit of this disclosure. Examples of such additives include, inter alia, fly ash, silica, fluid loss control additives, surfactants, dispersants, accelerators, retarders, salts, mica, fibers, formation-conditioning agents, bentonite, expanding additives, microspheres, weighting materials, defoamers, and the like. For example, the cement compositions of the present invention may be foamed cement compositions comprising one or more foaming surfactants that may generate foam when contacted with a gas, e.g., nitrogen. An example of a suitable fly ash is an ASTM class F fly ash that is commercially available from Halliburton Energy Services of Dallas, Tex. under the trade designation "POZMIX® A." An example of a suitable expanding additive comprises deadburned magnesium oxide and is commercially available under the trade name "MICROBOND HT" from Halliburton Energy Services, Inc., at various locations.

An example of a method of the present invention comprises a method of cementing a zone in a subterranean formation comprising: providing a cement composition comprising cement, inelastic lost circulation material particles, and water; placing the cement composition in a zone in a subterranean formation; and permitting the cement composition to set therein.

Another example of a method of the present invention comprises a method of reducing the loss of circulation of a cement composition in a zone in a subterranean formation comprising the step of adding an inelastic lost circulation material to the cement composition.

An example of a composition of the present invention comprises a cement composition comprising a hydraulic cement, an inelastic lost circulation material, and water.

Another example of a composition of the present invention is a lost circulation material comprising inelastic polyethylene, polystyrene, and/or polypropylene particles.

To facilitate a better understanding of the present invention, the following examples of exemplary embodiments are given. In no way should the following examples be read to limit, or to define, the scope of the invention.

EXAMPLE 1

Sample cement compositions were prepared by mixing a base cement slurry with a variety of lost circulation materials. After sample preparation, the samples were allowed to cure over a 7-day period, during which time compressive strength tests were performed at selected time intervals at 60° F. in accordance with API Specification 10, RP 8.3, Recommended Practices for Testing Well Cements.

Sample Composition No. 1 comprised 94 pounds of TXI Class C cement, 4% calcium chloride bwoc, 3% liquid sodium silicate bwoc, and 14.51 gallons of water.

Sample Composition No. 2 comprised 94 pounds of TXI Class C cement, 4% calcium chloride bwoc, 3% liquid sodium silicate bwoc, 5 pounds of a 50/50 mixture of ground waste FORMICA® material, and 14.51 gallons of water.

Sample Composition No. 3, a cement composition of the present invention, comprised 94 pounds of TXI Class C cement, 4% calcium chloride bwoc, 3% liquid sodium silicate bwoc, 5 pounds of a 50/50 mixture of fine-sized and medium-sized waste polyethylene particles, and 14.51 gallons of water.

The results of the testing are set forth in the table below.

TABLE 1

| Material | Compressive Strength (psi) at 60° F. | | | |
|---|---|---|---|---|
| | 24 Hours | 48 Hours | 72 Hours | 7 Days |
| Sample Composition No. 1 | 155 | 303 | 353 | 543 |
| Sample Composition No. 2 | 192 | 287 | 358 | 491 |
| Sample Composition No. 3 | 149 | 329 | 390 | 574 |

The above example demonstrates, inter alia, that the cement compositions of the present invention comprising inelastic lost circulation materials may be suitable for use in cementing operations in subterranean formations.

EXAMPLE 2

Sample Composition No. 4, a cement composition of the present invention, comprised 600 grams of Class H cement and 31.91 grams of a 50/50 mixture of medium fine inelastic polyethylene particles. Sample Composition No. 4 was passed through a series of ASTM mesh sieves ranging from 4 mesh to 325 mesh arranged in progression. At each stage of the progression, the amount of the sample composition retained in the individuals sieves was determined. The results of this testing are set forth in the table below.

TABLE 2

| Sieve Number | Sieve Size (inches) | Empty Weight (grams) | Dry Blend Sieve Weight (grams) | Weight of Blend on Sieve (grams) |
|---|---|---|---|---|
| 4 | 0.05 | 529.4 | 529.3 | −0.1 |
| 18 | 0.0394 | 398.3 | 431 | 32.7 |
| 35 | 0.0197 | 316.8 | 321.5 | 4.7 |
| 50 | 0.0117 | 291.3 | 476.4 | 185.1 |
| 325 | 0.0017 | 352.1 | 756.3 | 404.2 |

The above example demonstrates, inter alia, that the cement compositions of the present invention comprising improved lost circulation particles may be useful in preventing fluid loss through various voids and vugs in a subterranean formation.

EXAMPLE 3

Sample cement compositions were prepared by mixing a base cement slurry with a lost circulation material in accordance with the following procedure. The base cement slurry comprised a cement that comprised 55.9% Class H cement by weight, and 44.1% POZMIX® A by weight. Additives to this cement included 5% bentonite bwoc, 0.1% HR®-5 bwoc, and 0.75% HALAD®-344 bwoc, and sufficient water to provide a slurry having a density of 13.24 pounds per gallon. HALAD®-344 is a fluid loss control additive, and HR®-5 is a set retarder, both commercially available from Halliburton Energy Services, Inc., at various locations. Testing was performed in accordance with API Recommended Practice 10 B, effective date Oct. 1, 2002.

Sample Composition No. 5 consisted of the base cement slurry described above with no lost circulation material included.

Sample Composition No. 6, a composition of the present invention, was prepared by mixing the base cement slurry with 5.3% inelastic polyethylene particles bwoc.

The results of the testing are set forth in the table below.

TABLE 3

| Composition | Thickening Time (hr:min) |
| --- | --- |
| Sample Composition No. 5 | 5:15 |
| Sample Composition No. 6 | 4:50 |

The above example demonstrates, inter alia, that the cement compositions of the present invention comprising inelastic polyethylene particles may demonstrate thickening times that are suitable for use in subterranean operations.

Therefore, the present invention is well adapted to carry out the objects and attain the ends and advantages mentioned as well as those that are inherent therein. While the invention has been depicted and described by reference to exemplary embodiments of the invention, such a reference does not imply a limitation on the invention, and no such limitation is to be inferred. The invention is capable of considerable modification, alternation, and equivalants in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of cementing a zone in a subterranean formation comprising:

providing a cement composition comprising cement, inelastic lost circulation material particles, and water;

placing the cement composition in the zone in the subterranean formation; and permitting the cement composition to set therein.

2. The method of claim 1 wherein the water is present in the cement composition in an amount sufficient to form a pumpable slurry.

3. The method of claim 1 wherein the water is present in the cement composition in an amount in the range of from about 30% to about 180% by weight of the cement.

4. The method of claim 1 wherein the water is present in the cement composition in an amount in the range of from about 40% to about 50% by weight of the cement.

5. The method of claim 1 wherein the cement comprises a hydraulic cement.

6. The method of claim 5 wherein the hydraulic cement comprises at least one of the following: a Portland cement, a pozzolanic cement, a gypsum cement, a calcium phosphate cement, a high alumina content cement, a silica cement, a high alkalinity cement, or a mixture thereof.

7. The method of claim 1 wherein the inelastic lost circulation material particles comprises at least one of the following: polyethylene particles, polypropylene particles, polystyrene particles, or a mixture thereof.

8. The method of claim 1 wherein the inelastic lost circulation material particles comprise polyethylene particles.

9. The method of claim 8 wherein the polyethylene particles comprise waste polyethylene particles.

10. The method of claim 1 wherein the inelastic lost circulation material particles have a particle size distribution in the range of from about 100 microns to about 5,000 microns.

11. The method of claim 1 wherein the inelastic lost circulation material particles have a particle size distribution in the range of from about 200 microns to about 2,500 microns.

12. The method of claim 1 wherein the inelastic lost circulation material particles comprise about 45% to about 55% fine-sized particles by weight.

13. The method of claim 1 wherein the inelastic lost circulation material particles comprise about 45% to about 55% medium-sized particles by weight.

14. The method of claim 1 wherein the inelastic lost circulation material particles comprise about 45% to about 55% coarse-sized particles by weight.

15. The method of claim 1 wherein the inelastic lost circulation material particles are present in the cement composition in an amount in the range of from about 1 pound to about 10 pounds per sack of cement.

16. The method of claim 1 wherein the inelastic lost circulation material particles are present in the cement composition in an amount in the range of from about 4 pounds to about 6 pounds per sack of cement.

17. The method of claim 1 wherein the cement composition further comprises fly ash, a fluid loss control additive, a conventional lost circulation material, a surfactant, a dispersant, an accelerator, a retarder, a salt, a mica, fiber, a formation-conditioning agent, fumed silica, bentonite, an expanding additive, a microsphere, a weighting material, or a defoamer.

18. The method of claim 1 wherein the cement composition has a density in the range of from about 4 pounds per gallon to about 20 pounds per gallon.

19. The method of claim 1 wherein the cement composition has a density in the range of from about 8 pounds per gallon to about 17 pounds per gallon.

20. The method of claim 1 wherein the water is present in the cement composition in an amount in the range of from about 40% to about 50% by weight of the cement; wherein the inelastic lost circulation material particles are present in the cement composition in an amount in the range of from about 4 pounds to about 6 pounds per sack of the cement; wherein the inelastic lost circulation material particles comprise polyethylene particles; wherein the polyethylene particles have a particle size distribution in the range of from about 100 microns to about 5,000 microns; and wherein the cement composition has a density in the range of from about 4 pounds per gallon to about 20 pounds per gallon.

21. A method of reducing the loss of circulation of a cement composition in a zone in a subterranean formation comprising the step of adding inelastic lost circulation material particles to the cement composition.

22. The method of claim 21 wherein the cement composition comprises a hydraulic cement.

23. The method of claim 22 wherein the hydraulic cement comprises at least one of the following: a Portland cement, a pozzolanic cement, a gypsum cement, a calcium phosphate cement, a high alumina content cement, a silica cement, a high alkalinity cement, or a mixture thereof.

24. The method of claim 21 wherein the cement composition comprises water present in the cement composition in an amount sufficient to form a pumpable slurry.

25. The method of claim 24 wherein the water is present in the cement composition in an amount in the range of from about 30% to about 180% by weight of the cement.

26. The method of claim 24 wherein the water is present in the cement composition in an amount in the range of from about 40% to about 50% by weight of the cement.

27. The method of claim 21 wherein the inelastic lost circulation material particles comprises at least one of the following: polyethylene particles, polypropylene particles, and/or polystyrene particles, or a mixture thereof.

28. The method of claim 21 wherein the inelastic lost circulation material particles comprise polyethylene particles.

29. The method of claim 28 wherein the polyethylene particles comprise waste polyethylene particles.

30. The method of claim 21 wherein the cement composition further comprises fly ash, a surfactant, a dispersant, a conventional lost circulation material, a fluid loss control additive, an accelerator, a retarder, a salt, a mica, fiber, a formation-conditioning agent, formed silica, bentonite, expanding additives, microspheres, weighting materials, or a defoamer.

31. The method of claim 21 wherein the cement composition has a density in the range of from about 4 pounds per gallon to about 20 pounds per gallon.

32. The method of claim 21 wherein the cement composition has a density in the range of from about 8 pounds per gallon to about 17 pounds per gallon.

33. The method of claim 21 wherein the inelastic lost circulation material particles have a particle size distribution in the range of from about 100 microns to about 5,000 microns.

34. The method of claim 21 wherein the inelastic lost circulation material particles have a particle size distribution in the range of from about 200 microns to about 2,500 microns.

35. The method of claim 21 wherein the inelastic lost circulation material particles comprise about 45% to about 55% fine-sized particles by weight.

36. The method of claim 21 wherein the inelastic lost circulation material particles comprise about 45% to about 55% medium-sized particles by weight.

37. The method of claim 21 wherein the inelastic lost circulation material particles comprise about 45% to about 55% coarse-sized particles by weight.

38. The method of claim 21 wherein the inelastic lost circulation material particles are present in the cement composition in an amount in the range of from about 1 pound to about 10 pounds per sack of cement.

39. The method of claim 21 wherein the inelastic lost circulation material particles are present in the cement composition in an amount in the range of from about 4 pounds to about 6 pounds per sack of cement.

40. The method of claim 21 wherein the cement composition comprises water present in the cement composition in an amount in the range of from about 40% to about 50% by weight of the cement; wherein the inelastic lost circulation material particles are present in the cement composition in an amount in the range of from about 4 pounds to about 6 pounds per sack of the cement; wherein the inelastic lost circulation material particles have a particle size distribution in the range of from about 100 microns to about 5,000 microns; and wherein the cement composition has a density in the range of from about 4 pounds per gallon to about 20 pounds per gallon.

* * * * *